Patented Oct. 26, 1937

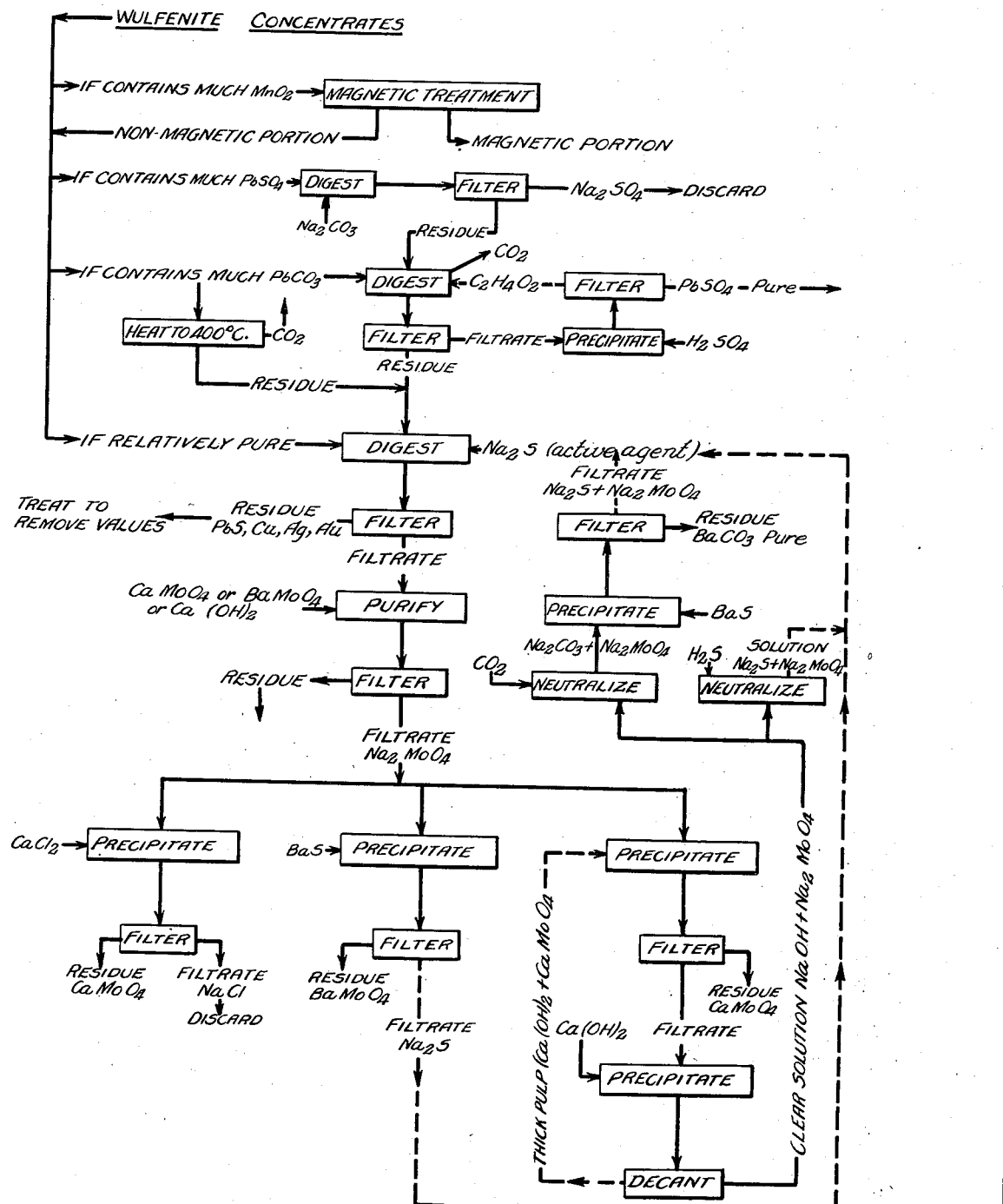

2,096,847

UNITED STATES PATENT OFFICE 2,096,847

METALLURGY OF MOLYBDENUM

Thomas H. Donahue and John B. Cunningham, Tucson, Ariz., assignors to Donahue and Cunningham, a co-partnership Application February 19, 1936, Serial No. 64,781

13 Claims. (Cl. 23—18)

This invention relates to a process for the recovery of molybdenum from ores and concentrates containing the mineral wulfenite.

In accordance with the present invention the wulfenite concentrates are subjected to alkali metal sulphide leaching which, as is well known, gives an excellent extraction of the molybdenum content. By the procedure to be described hereinafter the treatment for the recovery of the molybdenum content of the leachings is rendered cyclical, a product of high purity is produced, the consumption of reagents is reduced as compared to prior practice, and the procedure is such that it may be carried out in simple and inexpensive equipment.

The main steps of the process are shown in the flow sheet of the accompanying drawing.

The wulfenite concentrates preferably are leached with a sodium sulphide solution containing from about 2% to about 5% of $Na_2S$, at a temperature of from about 40° C. to about 70° C., although these temperature limits may be exceeded. At below about 40° C., however, the speed of the leaching becomes rather slow, and at above about 70° C. hydrogen sulphide is liberated, resulting in a nuisance. With pure wulfenite the sodium sulphide content would be practically completely consumed, but with the usual concentrates the sodium sulphide content of the leaching solution may generally be reduced to about 0.5% in a reasonable leaching time. The reaction with the wulfenite is represented by the equation $PbMoO_4 + Na_2S = Na_2MoO_4 + PbS$. The reaction proceeds fairly rapidly when the wulfenite is relatively coarse, but we prefer to grind the ore or concentrate to a fineness of about 40 mesh or finer to facilitate the leaching.

Leaching of wulfenite concentrates with sodium sulphide solution is old and the principal improvements in the complete process for the recovery of molybdenum from wulfenite ores or concentrates provided by the present invention reside in (1) the removal of certain impurities from the concentrate prior to leaching, (2) the purification of the solution produced by leaching, and (3) the recovery of molybdenum from the leaching solution and its regeneration to provide a cyclical process.

When ores containing wulfenite are concentrated either by gravity or flotation methods it is not possible to make a separation of other heavy minerals which are usually present and they will enter the concentrate with the wulfenite. Two impurities commonly found in wulfenite concentrates are cerussite ($PbCO_3$) and anglesite ($PbSO_4$). It is advantageous to remove these impurities from the concentrate before leaching in order to save leaching reagent and to simplify the subsequent operations. Incidentally the lead is recovered as by-product in more valuable form.

The ore may be relatively free of either or both $PbCO_3$ and $PbSO_4$ in which case either or both of the preliminary treatments for their removal may be omitted.

When the $PbSO_4$ content of the concentrate exceeds 10% it should generally be disposed of as follows:

The concentrate in suitably finely divided form, e. g. 100 mesh, is agitated with a dilute solution of sodium carbonate whereby the lead sulfate is converted to the carbonate in accordance with the reaction

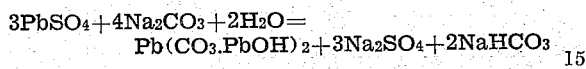

$$3PbSO_4 + 4Na_2CO_3 + 2H_2O =$$
$$Pb(CO_3.PbOH)_2 + 3Na_2SO_4 + 2NaHCO_3$$

The resulting solution is separated in any suitable way e. g. by filtration. A dilute solution of sodium carbonate, e. g. 1 to 2%, is used and in only slight excess in order to avoid dissolving molybdenum. The weight of the $PbSO_4$ in the concentrate should be about twice the weight of the sodium carbonate in the leaching solution. The leaching is facilitated by heating, but heating is not necessary. It will be understood that any suitable equivalent of sodium carbonate, e. g. ammonium or potassium carbonates or the bicarbonates may be used. If the lead sulphate content of the concentrate is low, as is generally the case, the foregoing treatment may be omitted.

The next step in the treatment of the concentrate is for the removal of lead carbonate and wulfenite concentrates generally contain sufficient of the lead carbonate to warrant this treatment. The preferred treatment for the removal of lead carbonate is by leaching it (or the residue from the treatment for the removal of sulphate) for several hours with acetic acid in slight excess. The following reaction occurs:

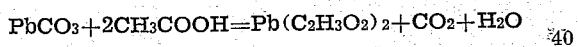

$$PbCO_3 + 2CH_3COOH = Pb(C_2H_3O_2)_2 + CO_2 + H_2O$$

A concentration of acetic acid solution of 10% at the start generally is satisfactory, but the concentration may be widely varied. The reaction is facilitated by heating to say 60° C., but care must be taken to avoid excessive foaming as a result of a too rapid liberation of $CO_2$. After the reaction is complete the solid residue is separated from solution, e. g. by filtering and washing. Other acids which give soluble salts of lead, e. g. nitric acid, may be substituted for the acetic acid. The treatment for the removal of lead carbonate may be rendered cyclical with regeneration of the acid used and recovery of lead in valuable form by treating the filtrate with sulphuric acid or hydrochloric acid thereby producing lead sulphate or chloride and regenerating the acetic acid or nitric acid.

Another method of purifying the concentrate with respect to lead carbonate is to heat the concentrate to from about 300° C. to about 400° C.

for about one hour whereby the lead carbonate is decomposed to lead oxid and carbon dioxide. The lead oxid remains in the concentrate, but since it reacts only slowly and to a limited extent with the sodium sulphide in the subsequent extraction of the molybdenum therewith, the effect is the same as though the lead carbonate were disposed of as in the treatment with acid described above.

If a substantial amount of manganese dioxide is present in the concentrate it preferably is removed prior to the treatments for the removal of sulphate and carbonate described above, by magnetic separation.

The concentrate, now suitably free of manganese dioxide, lead sulphate and lead carbonate, is next subjected to leaching with sodium sulphide solution which serves to dissolve not only the wulfenite but also vanadinite and other impurities. Any residual lead compounds present are converted into lead sulphide with a corresponding consumption of the sodium sulphide used for leaching. Silica and gangue materials remain unaffected. Of the alkaline earth metal compounds which may be present in the concentrate only calcium sulphate is found to react objectionably during the leaching with sodium sulphide. It may react with the sodium molybdate formed by the reaction of the sodium sulphide with the wulfenite, to the formation of calcium molybdate which is insoluble. Loss of molybdenum in this manner is avoided, however, by adding sufficient sodium carbonate to the sodium sulphide leaching solution to react with any calcium sulphate present or with any calcium molybdate formed during the sodium sulphide leaching to convert the calcium content thereof to the carbonate.

The next step in the process is the purification of the solution produced by the sulphide leaching step. This solution may contain, in addition to sodium molybdate and unconsumed sodium sulphide, also vanadate, phosphate, arsenate, chromate, carbonate, chloride and sulphate. The only one of these radicals which merits recovery is the vanadate, but if the solution is not purified prior to recovery of its molybdenum content by precipitation as calcium molybdate, the latter may be contaminated by vanadate, phosphate, arsenate, carbonate, and under some conditions also sulphate. Phosphorus, aresenic and sulphur are particularly objectionable impurities if the molybdate product is to be used in steel making. All attempts to purify the solution by precipitation of the impurities have been unsuccessful or unsatisfactory excepting by treatment with alkaline earth metal molybdate e. g. calcium molybdate. The solution is therefore digested with a suitable amount of the calcium molybdate product whereby vanadate, phosphate, arsenate and carbonate radicals are precipitated. Chromate, chloride and sulphate radicals remain in solution and are not precipitated when the solution is later treated with a calcium compound for the recovery of the molybdate content of the solution. In case barium molybdate instead of calcium molybdate is to be the final product, the purification of the solution is accomplished in the same manner by digesting it with a suitable addition of the product. In this case vanadate, phosphate, arsenate, chromate, carbonate and sulphate radicals will be precipitated during the purification and therefore will not appear in the final product resulting from the treatment of the purified solution with a soluble barium salt. The reactions involved in the purification treatment are illustrated by the following equations:

$$2Na_3VO_4 + 2CaMoO_4 + H_2O = Ca_2V_2O_7 + 2NaMoO_4 + 2NaOH$$

or $$Na_2CO_3 + CaMoO_4 = CaCO_3 + Na_2MoO_4$$

The purification works well because the precipitated impurities are readily separated by filtration. The digestion of the solution with the alkaline earth metal molybdate product preferably is carried out at a temperature near boiling and with agitation for from about 1 to about 2 hours. After the digestion insoluble matter is separated from the solution and it is ready for treatment for the recovery of its molybdate content.

The recovery of the molybdenum content of the purified sodium sulphide leaching solution may be effected by any of the well known methods for the precipitation of molybdenum, e. g. by treating the solution with calcium chloride at a temperature near boiling to precipitate calcium molybdate, but this method does not regenerate the sodium sulphide required for leaching and the process is not cyclical. We have therefore provided a procedure which does regenerate the sodium sulphide and render the complete process cyclical. This procedure comprises several modifications: (1) Precipitation of the molybdenum content of the solution by means of strontium or barium sulphide according to the reaction $$Na_2MoO_4 + BaS \rightarrow BaMoO_4 + Na_2S$$

Calcium sulphide cannot be used in this reaction on account of its relative insolubility. (2) Precipitation of the molybdenum content of the solution as calcium molybdate according to the reaction:

$$Na_2MoO_4 + Ca(OH)_2 = CaMoO_4 + 2NaOH$$

The caustic soda produced in this reaction is converted to $Na_2S$ by any of several methods in order to regenerate the leaching reagent.

The first modification involving the direct treatment of the solution with barium or strontium sulphide may be carried out very simply at ordinary temperatures but the solution should be warm from its previous treatment and this is advantageous in that it results in a more readily filterable precipitate. The precipitate is separated by filtration and washed and represents a finished product suitable for use in steel making. The filtrate contains sodium sulphide and may be used directly for leaching more wulfenite concentrate. The barium or strontium sulphides used are, of course, inexpensive and readily available reagents.

In the second modification, involving the use of calcium hydroxide or milk of lime, the reaction is slow because of the low solubility of the calcium hydroxide, and because the reaction tends to reach an equilibrium substantially short of complete precipitation of molybdenum, the process preferably is carried out in two stages. It will facilitate an understanding of this process to note that at 85° C. the reaction between calcium hydroxide and sodium molybdate proceeds very slowly. At 90° C. the reaction is still quite slow and therefore in order to complete the reaction to equilibrium in a reasonable length of time, say 3 or 4 hours, the temperature should be at least about 95° C. The equilibrium point depends upon the concentration of sodium hydroxide formed by the reaction and apparently may vary from about 75% to 90% precipitation of the molybdenum content of the solution.

In the preferred two-stage procedure the solution is first agitated for 2 to 3 hours at a temperature near boiling with a mixture of calcium molybdate and calcium hydroxide formed in the second stage of the preceding cycle. Only enough of this mixture is used to contain sufficient calcium hydroxide to react with roughly half of the molybdenum content of the solution. Thus all of the calcium hydroxide of the mixture is consumed and the resulting solid product, after being settled, filtered and washed, is substantially pure calcium molybdate and represents the final product of the process.

The filtrate and washings from this first-stage treatment are then treated with calcium hydroxide in quantity equivalent to the total molybdate to be precipitated in both the first and second stages. This will amount to from about 75% to about 90% of the total molybdate content of the solution entering the first stage depending on the sodium molybdate content of the solution. This quantity of calcium hydroxide added to the solution in the second stage after a portion of its molybdate content has been precipitated in the first stage, provides a large excess of the calcium hydroxide and favors complete and rapid precipitation of the molybdate content of the solution. The mixture is agitated and held at about 95° C. or higher for 2 or 3 hours and then settled and filtered. The solid residue consisting essentially of calcium molybdate and calcium hydroxide is used as the precipitant in the first stage of the treatment of the molybdate solution as described above.

The filtrate from the second stage of the precipitation of the molybdate content of the solution contains principally sodium hydroxide and sodium molybdate. In order to render the process cyclical the sodium hydroxide content of the filtrate must be converted to sodium sulphide. This may be done by contacting the filtrate with hydrogen sulphide gas which should be as free as possible of carbon dioxide and sulphur dioxide.

Instead of the direct treatment of the filtrate to convert its sodium hydroxide content to sodium sulphide as described above, the following procedure may be followed:

The filtrate is treated with an acid whose barium or strontium salt is insoluble, e. g. carbonic acid ($CO_2$) or sulphuric acid, whereby the sodium hydroxide is converted into the corresponding salt, e. g. sodium carbonate or sodium sulphate. A small amount of the sodium hydroxide content of the solution is left unneutralized. The filtrate is then treated with a slight deficiency of a strong solution of strontium or barium sulphide whereby the sodium salt is converted to the sulphide and the barium or strontium is precipitated and recovered as an insoluble salt, i. e. barium or strontium sulphate or carbonate. In order to produce a pure barium or strontium carbonate as a valuable by-product, it will be necessary to perform the purification operation with the corresponding barium or strontium molybdate. For example, if barium carbonate is being produced and the purification is performed with calcium molybdate, the sulphate and chromate content will not be precipitated by the calcium molybdate, but will be precipitated when the solution is treated with barium sulphide to regenerate the sodium sulphide, and will consequently contaminate the barium carbonate with barium sulphate and barium chromate. However, if $BaMoO_4$ is employed for purification instead of $CaMoO_4$ the sulphate and the chromate will be precipitated at this point as insoluble salts and therefore will not contaminate the $BaCO_3$ subsequently precipitated. The purification with $BaMoO_4$ will serve to remove the impurities, such as phosphate, carbonate, vanadate, equally as well and as readily as if $CaMoO_4$ were used. The resulting regenerated solution containing sodium sulphide and sodium molybdate is returned to the step of the complete process in which the purified wulfenite concentrate is leached with sodium sulphide solution. Thus it will be seen that none of the molybdenum leached out of the ore is lost and the sulphide ion required for the process is provided from an inexpensive source, i. e. hydrogen sulphide or barium or strontium sulphide which may be produced by simple reduction of the sulphates.

Three methods of precipitating and recovering the molybdate content of the leaching solution containing sodium molybdate have been described, i. e. (1) the old method of treating with calcium chloride or equivalent reagent at a temperature near boiling, without regeneration of the sodium sulphide leading solution, (2) treatment with barium or strontium sulphide with direct regeneration of the sodium sulphide, and (3) treatment with calcium hydroxide in two stages with regeneration of the sodium sulphide by treatment with either hydrogen sulphide or with an acid which forms an insoluble salt with barium or strontium and then with barium or strontium sulphide. The selection of the appropriate one of these methods will depend upon the circumstances and local conditions with respect to costs of reagents and the value of the various by-products.

The complete process described obviously is capable of wide variation. Some of the steps described can be omitted as has been described; for instance, if the ore or concentrate does not contain the impurities referred to, e. g. carbonate and sulphate, the steps for the removal of these impurities may be omitted.

The scope of the invention is defined by the appended claims.

We claim:—

1. Process for the recovery of molybdenum from wulfenite ores or concentrates which comprises leaching the same with sodium sulphide solution, separating the molybdenum containing liquor, purifying by reacting with an excess of barium molybdate at approximately the boiling point, separating the insoluble impurities, precipitating the molybdenum content of the resulting solution by reacting with a solution of barium sulphide, separating the precipitated barium molybdate and using the mother liquor containing the regenerated sodium sulphide for leaching more ore or concentrates in a cyclic process.

2. Process for recovery of molybdenum from impure wulfenite ores or concentrates which comprises digestion with alkali metal carbonate solution to remove sulphates, separation of the solution, treatment of the residue with dilute acetic acid to remove carbonates, separation of the solution, treatment of the residue by leaching with sodium sulphide solution, separating the molybdenum containing liquor, purifying by reacting with an excess of calcium molybdate at approximately the boiling point, separating the insoluble impurities, precipitating the molybdenum content of the resulting solution by reacting with a solution of calcium chloride at approximately the boiling point and separating the precipitated calcium molybdate.

3. Process for recovery of molybdenum from wulfenite ores or concentrates which comprises leaching the same with sodium sulphide solution, separating the molybdenum containing liquor, purifying by reaction with an excess of calcium molybdate at approximately the boiling point, separating the insoluble impurities, precipitating the molybdenum content of the resulting solution by reacting with milk of lime in two stages, separating the precipitated calcium molybdate and treating the mother liquor with hydrogen sulphide gas to convert its sodium hydroxide content to sodium sulphide and using the so treated liquor for leaching more ore or concentrates in a cyclic process.

4. Process for recovery of molybdenum from wulfenite ores or concentrates which comprises leaching the same with sodium sulphide solution, separating the molybdenum containing liquor, purifying by reacting with an excess of barium molybdate at approximately the boiling point, separating the insoluble impurities, precipitating the molybdenum content of the resulting solution by reacting with milk of lime in two stages, separating the precipitated calcium molybdate, treating the mother liquor with carbon dioxide gas and subsequently with a strong solution of barium sulphide, separating the precipitated barium carbonate, and using the separated liquor for leaching more ore or concentrates in a cyclic process.

5. Process for the recovery of molybdenum from lead molybdate ores or concentrates which comprises leaching the same with alkali metal sulphide solution, purifying the leaching solution by reacting it with alkaline earth metal molybdate, and precipitating the molybdenum content of the purified solution as an alkaline earth metal molybdate.

6. Process of recovering molybdenum from wulfenite ores or concentrates containing lead carbonate which comprises heating the same at a temperature between about 300° C. and about 400° C. to decompose the lead carbonate, leaching with alkali metal sulphide solution and precipitating the molybdenum from the leaching solution as an alkaline earth metal molybdate.

7. Process of recovering molybdenum from wulfenite ores or concentrate containing lead sulphate and lead carbonate which comprises digesting the same with a soluble carbonate, separating the solution, leaching the insoluble residue with a dilute acid of the group consisting of nitric acid and acetic acid, separating the solution and leaching the insoluble residue with alkali metal sulphide solution and precipitating the molybdenum from the leaching solution as an alkaline earth metal molybdate.

8. Process for the recover of molybdenum from wulfenite ores or concentrates which comprises leaching the same with alkali metal sulphide solution, purifying the leaching solution by reaction with a portion of the alkaline earth metal molybdate product, precipitating the molybdenum content of the purified solution by reacting it with a soluble alkaline earth metal sulphide and simultaneously regenerating the alkali metal sulphide in the mother liquor, and using the mother liquor containing the regenerated alkali metal sulphide for leaching more ore or concentrate in a repetition of the procedure.

9. Process for recovery of molybdenum from wulfenite ores or concentrates which comprises leaching the same with alkali metal sulphide solution, precipitating the molybdenum content of the resulting leaching solution by reaction with a soluble alkaline earth metal sulphide and simultaneously regenerating the alkaline metal sulphide in the mother liquor and using the mother liquor containing the regenerated alkali metal sulphide for leaching more ore or concentrate in a repetition of the procedure.

10. Process for the recovery of molybdenum from wulfenite ores and concentrates which comprises leaching the same with alkali metal sulphide, precipitating the molybdenum content of the leaching solution by reaction with calcium hydroxide, converting the resulting alkali metal hydroxide content of the mother liquor to alkali metal sulphide by reaction with hydrogen sulphide and using the regenerated alkali metal sulphide for leaching more ore or concentrate in a repetition of the procedure.

11. Process for the recovery of molybdenum from wulfenite ores and concentrates which comprises leaching the same with alkali metal sulphide, precipitating the molybdenum content of the leaching solution by reaction with calcium hydroxide, converting the resulting alkali metal hydroxide content of the mother liquor to sulphide by reaction with an acid which forms insoluble salts with barium and strontium and then by reaction with a soluble alkaline earth metal sulphide, and using the mother liquor containing the regenerated alkali metal sulphide for leaching more ore or concentrate in a repetition of the procedure.

12. Process for the recovery of molybdenum from wulfenite ores and concentrates which comprises leaching the same with alkali metal sulphide solution, precipitating and recovering the molybdenum content of the leaching solution by digesting in two stages, in the first stage with a mixture of calcium molybdate and lime formed in the second stage, and in the second stage with a quantity of lime equivalent to the total quantity of molydenum contained in the original leaching solution which may be precipitated by reaction with lime, regenerating the alkali metal sulphide in the mother liquor and using the mother liquor containing the regenerated alkali metal sulphide for leaching more ore or concentrate in a repetition of the procedure.

13. Process for the recovery of molybdenum from impure wulfenite ores or concentrates containing sulfate and carbonate which comprises digesting the same with alkali metal carbonate solution, separating the solution, treating the residue with dilute acetic acid, separating the solution, treating the residue by leaching with alkali metal sulphide solution, purifying the resulting leaching solution by reaction with a portion of the alkaline earth metal molybdate product and precipitating the molybdenum content of the purified solution as an alkaline earth metal molybdate by reaction with calcium chloride.

THOMAS H. DONAHUE.
JOHN B. CUNNINGHAM.